Aug. 14, 1956

K. A. BROWNE 2,758,552

RAILWAY AUTOMOBILE CARRIER

Filed July 20, 1953

INVENTOR.
KENNETH A. BROWNE
BY
Bosworth Sessions, Herrstrom
& Williams
ATTYS.

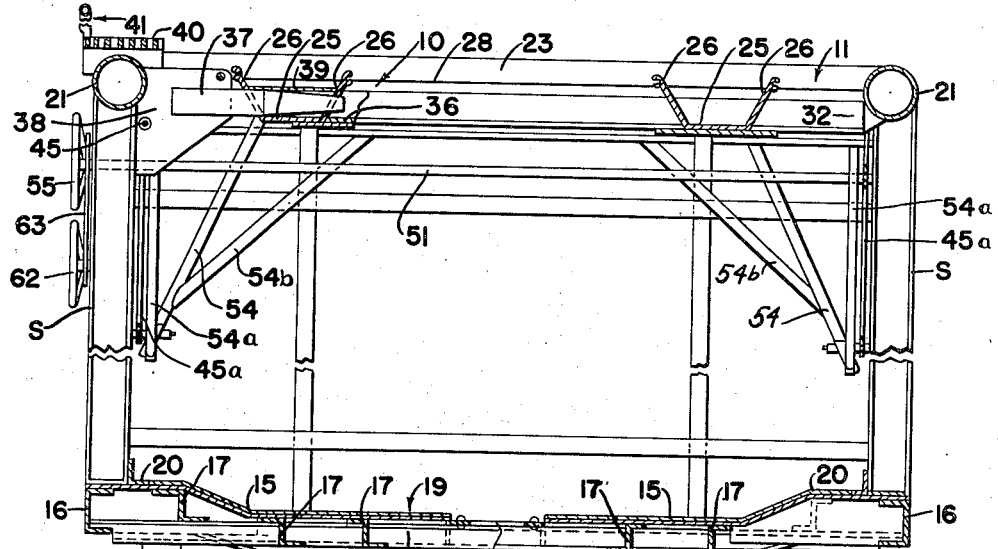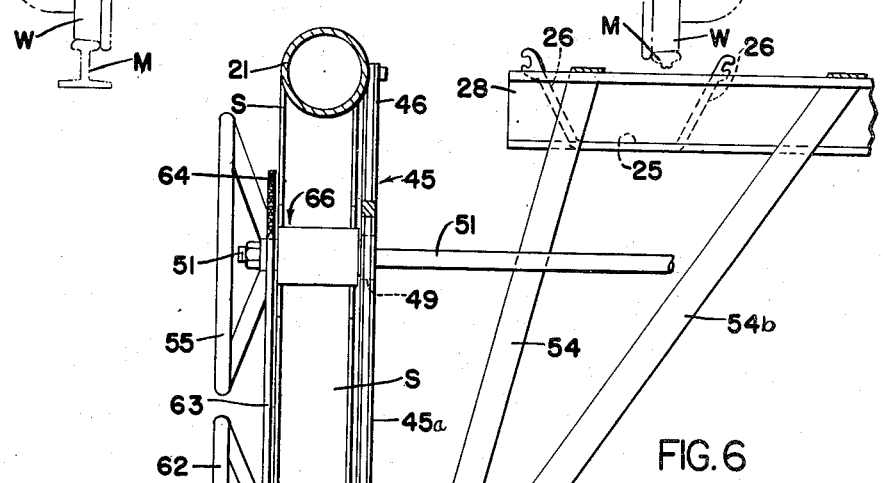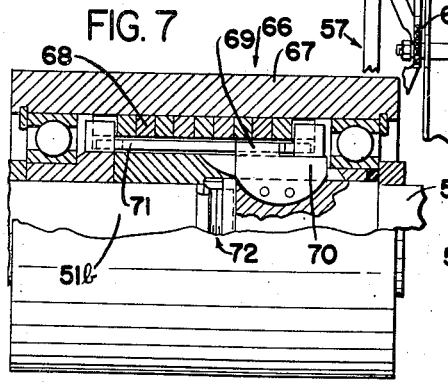

Aug. 14, 1956 K. A. BROWNE 2,758,552
RAILWAY AUTOMOBILE CARRIER
Filed July 20, 1953 4 Sheets-Sheet 3

INVENTOR.
KENNETH A. BROWNE
BY
Bosworth, Sessions, Herrstrom
& Williams
ATTYS.

Aug. 14, 1956 K. A. BROWNE 2,758,552
RAILWAY AUTOMOBILE CARRIER
Filed July 20, 1953 4 Sheets-Sheet 4

INVENTOR.
KENNETH A. BROWNE
BY
Bosworth, Sessions, Herrstrom
& Williams
ATTYS.

United States Patent Office 2,758,552
Patented Aug. 14, 1956

2,758,552

RAILWAY AUTOMOBILE CARRIER

Kenneth A. Browne, Lakewood, Ohio, assignor to The Chesapeake and Ohio Railway Company, Cleveland, Ohio, a corporation of Virginia Application July 20, 1953, Serial No. 369,016

8 Claims. (Cl. 105—368)

This invention relates to a railway car and more particularly to the type of railway car called an automobile carrier which is adapted to carry a plurality of automobiles.

A general object of my invention is to provide a railway automobile carrier which can readily accommodate a plurality of automobiles for safe transportation from place to place. Another object is to provide a railway automobile carrier which can be loaded and unloaded safely and quickly.

Other objects are: the provision of a railway automobile carrier which may be loaded into and unloaded from the side of the carrier and from existing railway loading docks; the provision of a railway automobile carrier with a self-contained loading ramp which can be operated conveniently and safely by one operator; the provision of a carrier with an upper and lower deck that can support a plurality of automobiles in a horizontal position; and the provision of a method or technique of loading and unloading a railway automobile carrier which is simple, safe and fast and which involves the services of a minimum number of operators.

These and other objects of my invention will become apparent from the following description of a preferred embodiment thereof, reference being had to the accompanying drawings.

Figure 3 shows the ramp in the horizontal or "up" position, and Figure 4 shows the ramp in an inclined position.

Figure 5 is a transverse section of the carrier taken on the line 5—5 of Figure 2.

Figure 6 is a fragmentary vertical section take on the line 6—6 of Figure 1 and showing the mechanism which raises and lowers the loading ramp.

Figure 7 is an enlarged view partially in section of a safety clutch which forms a part of the loading ramp actuating mechanism.

Figure 2:
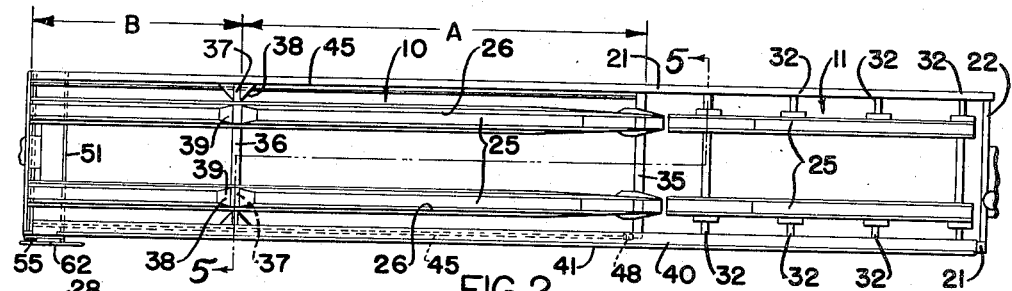
Figure 2 is a plan view of the carrier shown in Figure 1.

Figures 8–14 inclusive, are schematic side views of the railway automobile carrier of Figure 2 and showing in sequence the steps in the carrier loading operation.

The railway automobile carrier which embodies my invention preferably is a railway car C having an open sided open top car body mounted on standard railway trucks T for raiding on tracks M. The car may be coupled to other railway cars in a train in the usual manner.

The body of the car has a frame comprising a plurality of longitudinally spaced vertical side struts S interconnected by diagonal members D and has an upper deck U and a lower deck L which extend the full length of the car, each deck preferably being constructed to support at least three automobiles arranged in a line. It will be understood, however, that these decks can be constructed to support more than three automobiles without departing from the precepts of my invention. The upper deck U is vertically aligned with and spaced from the lower deck L sufficiently to provide safe clearance for automobiles carried on the lower deck and is supported on the upper parts of the struts S. The carrier preferably is adapted to be loaded from either side and for this purpose the side struts S' closest to the center of the carrier are spaced apart sufficiently to permit an automobile to be driven therebetween diagonally onto the lower deck L, as shown, for example, in Figure 8, during loading and unloading operations which will be explained more fully below. Diagonally extending reinforcing tie rods R which are detachably connected to the opposite ends of center struts S', respectively, are removed when the car is being loaded or unloaded and are replaced when the carrier is in transit.

The height of the top surface of the lower deck L adjacent the sides of the car above the railway tracks M on which the car runs preferably is the same as the height of a standard railway car loading dock. The automobile carrier preferably is loaded and unloaded by driving automobiles under their own power from and to such loading docks onto and from the lower deck L. The carrier thus utilizes present railway car loading docks and requires no additional equipment for loading and unloading.

In order to raise automobiles that have been moved onto the lower deck L to the upper deck U of the carrier, a ramp 10 pivotally supported at the level of the upper deck is provided. When the ramp 10 is lowered to the inclined position indicated in dot-dash lines in Figure 1, an automobile previously driven onto the lower deck is driven on the ramp which is thereafter raised to the level of the upper deck. The damp when raised to a horizontal position so that it lies in the plane of the upper deck, constitutes part of the upper deck for supporting automobiles to be transported. The length of the ramp preferably is somewhat less than the length of the carrier to permit loading of same as will be explained below. The upper deck U also comprises a stationary platform 11 which is aligned with and is closely spaced to the ramp 10 so that an automobile on the ramp may be moved to the platform 11 during loading of the carrier or may be returned to the ramp from the platform during the unloading operation. Preferably the length of the ramp is sufficient to accommodate two automobiles, and the platform 11 is sufficiently long to support at least one automobile. The upper deck U of the carrier described herein and illustrated in the drawings therefore is capable of carrying three automobiles and lower deck L an equal number.

The lower deck L comprises top plates 15, see Figure 5, supported on and suitably secured to longitudinally extending side beams 16 and to intermediate longitudinal members 17 located at intervals between the side channel members 16, the members 16 and 17 being rigidly secured at their ends to cross beams 18 forming part of the structure of the underframe F of the carrier. This underframe F is supported in the usual manner on conventional railway trucks T having wheels W riding on tracks M. The central or automobile carrying part 19 of the lower deck preferably is depressed below the level of the side parts 20 of the deck to provide additional clearance between the top of the automobiles on the lower deck, and the upper deck. The height of the top surfaces of the side parts 20 of the lower deck above the track, as mentioned above, correspond to the height of standard railway loading docks to permit automobiles to be driven from the docks directly onto the lower deck.

Figure 1:
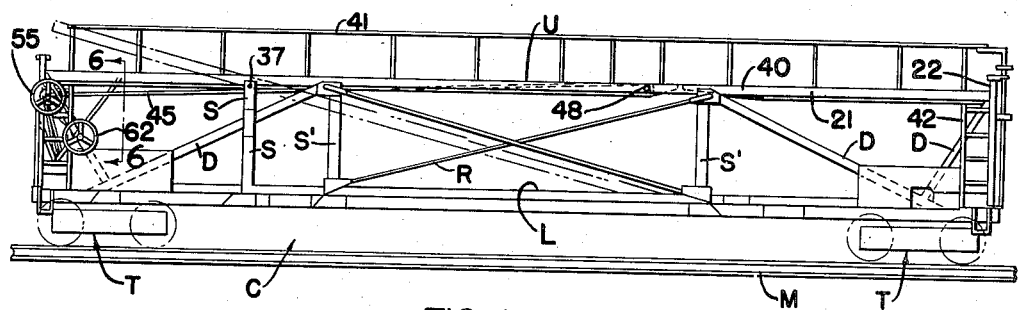
Figure 1 is a side elevation of a railway automobile carrier embodying my invention, the position of the self-contained loading ramp when lowered being indicated in dot-dash lines.

The upper deck U comprises a pair of main side frame members 21, preferably of pipe as shown in Figures 5 and 6, which extend the length of the carrier; said members 21 are joined to the tops of the vertical struts S and are connected at the ends of the carrier to cross beams 22 and 23, see also Figures 1 and 2.

The ramp 10 and the stationary platform 11 are located between and are supported on the side frame members 21 and each comprise a pair of elongated rigid track members 25 laterally spaced apart a distance corresponding to the average transverse spacing of the wheels of conventional automobiles. The sides 26 of the track members 25 preferably are inclined outwardly and upwardly to prevent rubbing of the side walls of the automobile tires. A transversely extending stop member 28, see Figures 3, 4 and 6, on the ramp and the transverse beam 22 at the end of the stationary platform (see Figure 1) limit the extent of travel of automobiles on the tracks. These stops define the proper longitudinal position of the automobiles carried on the ramp and platform; that is, when the front wheels of an automobile engage stop 28 on the ramp, there is sufficient space on the ramp behind that automobile to accommodate a second automobile, and when the rear bumper of an automobile which has been backed onto the stationary platform 11 from the ramp 10 engages the stop member 22 at the end of the platform, the front end of the automobile will be located inwardly from the inner end of the platform and thus avoid interference with the second automobile on and adjacent the inner end of the ramp when the ramp is raised. I prefer also that the inner ends of the track members 25 of the stationary platform be inclined slightly upwardly as shown more clearly at 30 in Figures 8–14 inclusive, to minimize the tendency of the automobile to roll during transit.

The track members 25 of the stationary platform 11 are rigidly secured to the main side frame members 21 by transverse supports 32. The tracks 25 of the ramp are connected rigidly together by transverse members 28 and 35, see Figures 3 and 4, at the ends of the ramp and by a member 36 intermediate the ends. Pivot studs 37 project from the ends of the intermediate member 36 and are engaged in pivot supports 38 secured to the main side members 21 of the upper deck and thus support the ramp 10 as a unit for pivoting about a transverse horizontal axis; that is, the common axis of pivot lugs 37, when the ramp is raised and lowered. The inner ends of pivot studs 37 traverse the tracks 25 of the ramp and are covered by plates 39 with inclined faces to permit the wheels of the automobile to pass over the pivot studs. The mechanism for raising and lowering the ramp will be described below.

In order to permit the drivers of the automobiles to mount and dismount the upper deck when the carrier is being loaded and unloaded, a walkway 40, see Figures 1, 2 and 5, provided with a hand rail 41 is fixed on top of the left hand as viewed main side frame member 21 and leads to ladders 42 at either end of the carrier.

Figure 3:
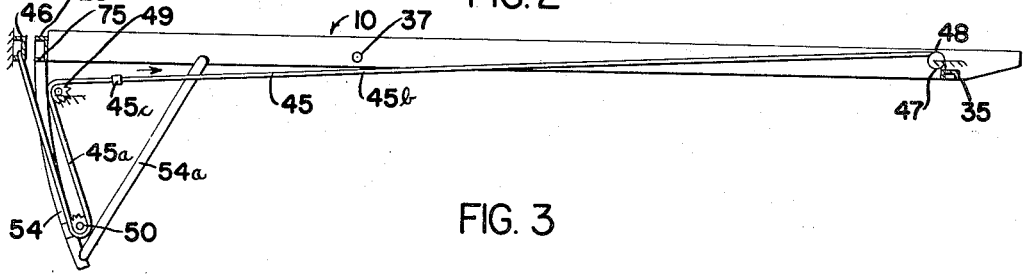
Figures 3 and 4 are schematic elevations of the loading ramp and mechanism for actuating same which form a part of my invention, the parts being illustrated out of proportion for convenience in describing the operation of same.
Figure 4:
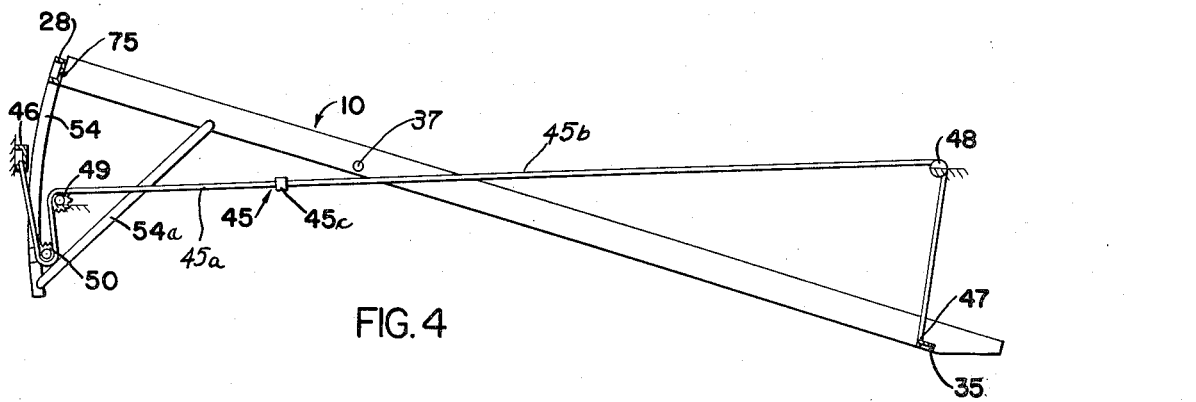
Figure 8:
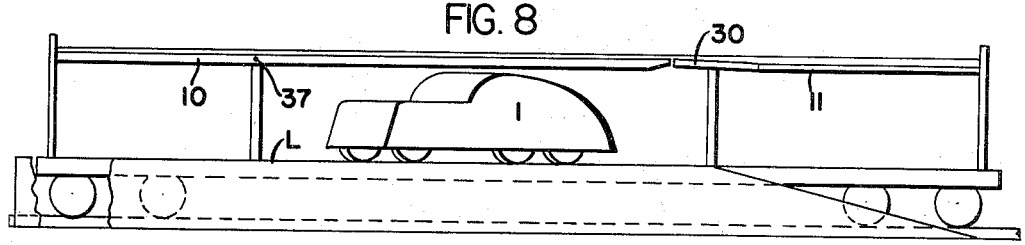
Figure 9:
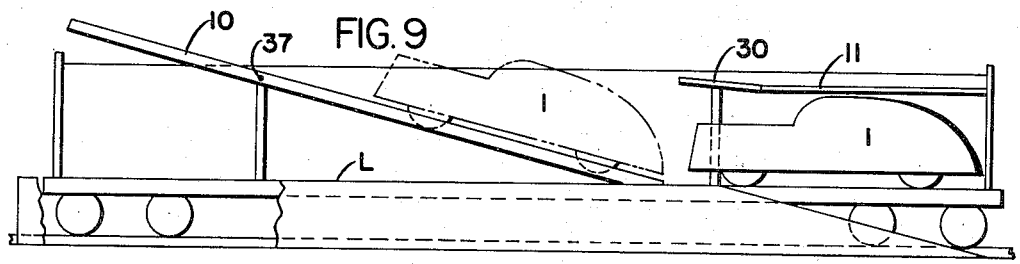

The mechanism for raising and lowering the ramp 10 is shown in detail in Figures 6 and 7 and schematically in Figures 3 and 4 and preferably comprises identical continuous tension elements, indicated in general at 45 on both sides of the carrier, each being secured at one end 46 to the frame of the carrier and at the opposite end 47 passing over a sheave 48 on the frame member 21 and being secured to the transverse member 35 near the inner longitudinal end of the ramp. Each tension element comprises a chain portion 45a and a cable portion 45b connected together at 45c. In order to actuate the tension elements 45 to raise and lower the ramp, I provide adjacent the outer (or left as viewed in Figure 1) end of the ramp on opposite sides of the carrier drive sprockets 49 mounted on the carrier frame and lift sprockets 50 on the ramp unit, these sprockets being spaced apart as shown. The chain portion 45a of each tension element 45 engages these sprockets and when moved or driven by drive sprocket 49 causes the lift sprocket 50 along with the outer end of the ramp to be raised or lowered depending on the direction of rotation of drive sprockets 49. Drive sprockets 49 are mounted on shaft 51 which extends the full width of the carrier and which is supported on the vertical struts S at the end and on opposite sides of the carrier. Each lift sprocket 50 is mounted on a stub shaft 52 journalled in suitable bearings carried by an arm 54 extending downwardly and inwardly from and connected to the outer or leftward as viewed end of the ramp 10 and which is reinforced by braces 54a and 54b. Handwheel 55 is secured to one end of shaft 51 for manually driving sprockets 49 although it will be understood that any suitable motor or other power device may be used if so desired.

When it is desired to lower or tilt the ramp from the raised or horizontal position shown in Figure 3, handwheel 55 is rotated so as to turn the drive sprockets 49 clockwise as viewed in Figures 3 and 4 and as indicated by the arrow. This causes each tension element 45 to move to the right as viewed in the direction of the arrow from the sprockets 49, tensioning the reach of the chain between sprockets 49 and 50 and lifting sprockets 50 and ramp arms 54. This causes the outer end of the ramp to be elevated relative to the carrier frame and the ramp pivots clockwise as viewed about the axis of pivot studs 37. The cable portions 45b of the tension elements 45 as they are payed out from drive sprockets 49 move around and down from sheaves 48 on the carrier frame and remain substantially taut. The inner end of the ramp is thus lowered as indicated schematically in Figure 4 until it engages and rests on the lower deck as shown in dot-dash lines in Figure 1. Raising of the ramp from its lowered position is accomplished by rotation of handwheel 55 in the opposite direction, the ramp pivoting counterclockwise as viewed until it is positioned horizontally as determined by appropriate stops.

Referring now to Figures 3 and 4, the use of lift sprockets 50 on ramp arms 54 as a means of pivoting the ramp provides the drive mechanism with a mechanical advantage of 2:1, sprockets 49 and 50 having the same diameter. With such an arrangement, for one revolution of the drive sprockets 49, the outer, left as viewed end of the ramp will be elevated a certain distance, say X inches, while the length of each tension element payed out from sprockets 50 will be twice that amount, 2X inches. In order to maintain the tension elements 45 desirably taut throughout the raising and lowering of the ramp, the ramp length is so proportioned that the longitudinal distance between the axis of pivot studs 37 and the point to which the end 47 of each tension element 45 is connected to transverse member 35 at the inner end of the ramp, that is, distance A on Figure 2, be exactly twice the distance, indicated as B, between the pivot stud axis and the connection of ramp arm 54 to the ramp indicated at 75, see Figures 3 and 4; the position of arm 54 on the ramp being such that sprocket 50 at the lower end of the arm, when the ramp is pivoted, moves through an arc having a center on the pivot stud axis and a radius equal to the distance B. With this arrangement, the length of the arcuate path through which the point of connection 47 of the tension element to the inner end of the ramp will move for a given degree of rotation of the ramp will be twice that for sprocket 50 connected to the outer end of the ramp and the tension elements 45 will remain uniformly taut throughout the raising and lowering of the ramp.

In order to provide additional mechanical advantage in the mechanism for manually raising and lowering the ramp, especially when the ramp is loaded, an auxiliary drive mechanism 57, see Figure 6, is mounted on the carrier frame on the same side as handwheel 55 and is operatively connected to the shaft 51 for rotating same with increased mechanical advantage. The auxiliary drive mechanism comprises a relatively small sprocket 60 mounted on a stub shaft 61 supported on the carrier frame, and an auxiliary handwheel 62 mounted on the shaft 61. Sprocket 60 is connected by a chain 63 to a sprocket 64 having a larger diameter than sprocket 60 and non-rotatably mounted on shaft 51 adjacent the handwheel 55. When the auxiliary handwheel 62 is rotated at a given rate by an operator, the tension elements 45 will be actuated through rotation of shaft 51 and drive sprockets 49 but at a slower rate than by rotation of the main drive handwheel 55 at the given rate, the mechanical advantage being determined by the difference in diameters of sprockets 60 and 64. I prefer that the auxiliary drive mechanism be located downwardly and forwardly, as viewed in Figure 1, from the upper shaft 51 for convenience in operating and maintaining these parts of the drive system.

When the ramp is being raised or lowered during loading or unloading operations and especially when the ramp itself is loaded, there is danger that the operator, actuating the raising and lowering mechanism, may lose control of the handwheels, permitting the loaded ramp to pivot rapidly with possible damage to equipment and injury to personnel. To avoid this hazard, I provide a two-way no-back clutch unit 66, see Figures 6 and 7, on one end of the drive shaft 51 between handwheel 55 and the adjacent drive sprocket 49. This clutch comprises a cylindrical outer casing 67 secured to the vertical strut S, a coiled spring 68 comprised of flat wire normally expanded against and in frictional contact with the interior of the casing, a spring contracting member 69 keyed by key 70 to and actuated by the part 51a of shaft 51 shown at the right side of Figure 7, and a spring expanding member 71 connected to the left as viewed part 51b of the shaft 51. Shaft part 51b is coupled to part 51a through a lost motion coupling indicated at 72. Handwheels 55 and 62 are operatively connected to part 51a, and sprockets 49 which drive the tension elements 45 are secured to part 51b. The frictional engagement of the casing 67 by the spring 68 locks shaft part 51b against rotation. When shaft part 51a is rotated in either direction, the first increment of rotation causes member 69 to contract spring 68 which is withdrawn from frictional engagement with the clutch casing 67 and unlocks the clutch. As rotation of part 51a continues, the lost motion in coupling 72 is taken up and a positive drive connection between parts 51a and 51b is made so that part 51b rotates with part 51a. When the rotation of handwheel 55 is stopped, the contracting force acting on spring 68 is released and the spring is expanded, through actuation of spring expanding member 71 by shaft part 51b, against the outer casing 67 and prevents rotation of part 51b and the drive sprockets 49 connected thereto. The drive mechanism for raising and lowering the ramp therefore can be actuated only by motion of handwheels 55 and 62, the two-way no-back cluch 66 preventing the ramp from pivoting on its own under unbalanced loads. The construction of the clutch 66 is well known and per se does not form a part of my invention and is not claimed as such.

The preferred method or system of loading the railway automobile carrier described above is as follows: In Figures 8-14, inclusive, there are shown schematic side elevations of the railway automobile carrier described above with automobiles designated by numbers corresponding to the order in which they are loaded shown in various positions on the carrier during loading operations. With ramp 10 in the raised position, Auto 1, and subsequently each of the other automobiles to be loaded, is backed diagonally from the railway loading dock onto lower deck L, see Figure 8, into the position shown in solid line in Figure 9, that is, at the right as viewed end of the carrier. The ramp 10 is then lowered and Auto 1 is driven forwardly to the left as viewed onto the ramp as indicated in broken lines in Figure 9. The ramp is then raised to the horizontal or "up" position and Auto 1 is driven backwardly to the right as viewed onto stationary platform 11 to the position shown in Figure 10 which Auto 1 will occupy on the carrier during transit. The driver of Auto 1 dismounts the carrier by means of walkway 40 and ladders 42, see Figures 1, 2 and 5, and is ready to load another automobile on the carrier. This dismounting procedure is likewise followed by the driver or drivers of Autos 2 and 3. Although one man acting as the driver and as operator for the ramp actuating mechanism is the only person required for loading the carrier, additional drivers and operators may be used to speed up the loading operation.

Figure 10:
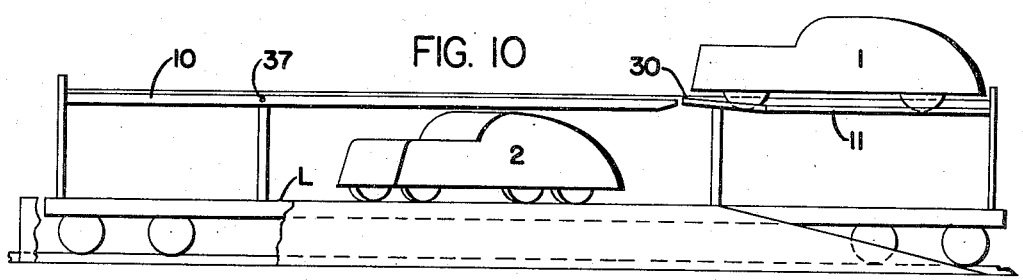
Figure 11:
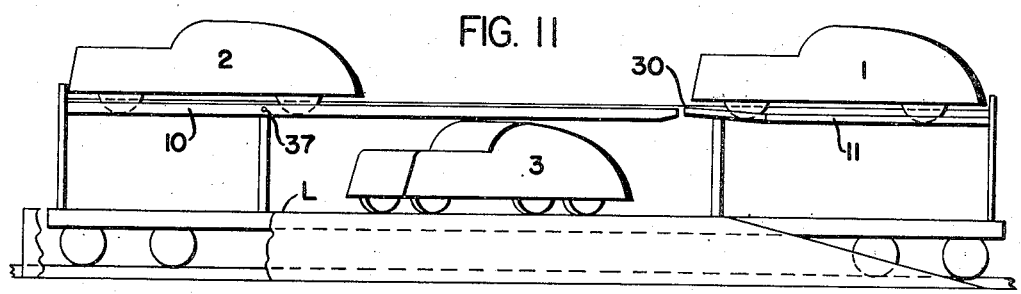
Figure 12:
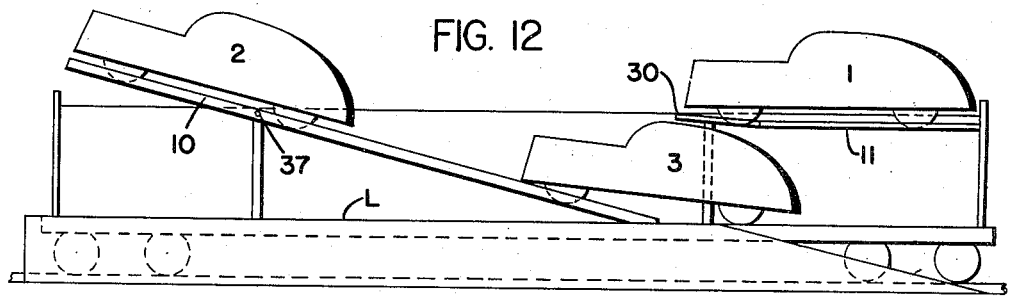
Figure 13:
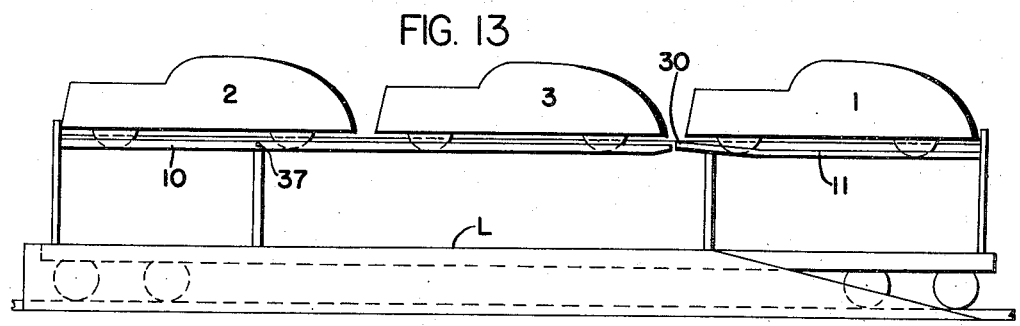

As soon as the ramp and Auto 1 are raised to the "up" position, Auto 2, see Figure 10, is backed onto the right end of lower deck L, and after the ramp is lowered, is driven forwardly to the opposite or left end of the ramp and the ramp is raised, see Figure 11. Auto 3 is then backed onto the lower deck L, see Figure 11, in a similar manner and is driven forwardly onto the ramp, see Figure 12, until it occupies the place on the ramp directly behind Auto 2, and the ramp is again raised. The upper deck U is now fully loaded, see Figure 13. The ramp is then locked in the "up" position by suitable locking means.

Figure 14:
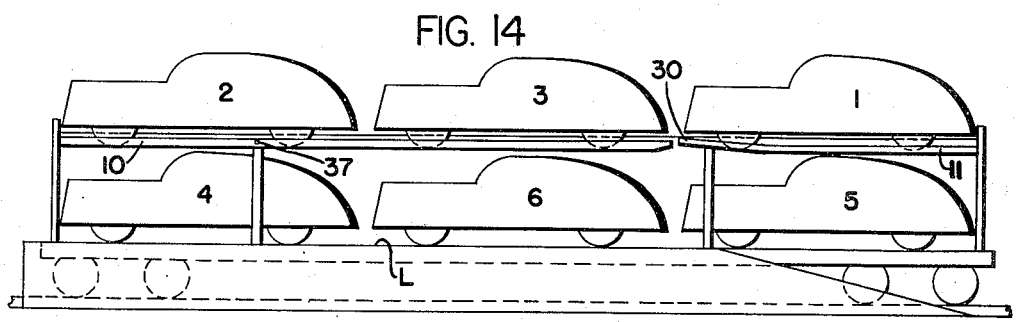

Next, the lower deck L is loaded, Auto 4 preferably being backed onto the carrier and driven forwardly to the left end of deck L to the position shown in Figure 14. Auto 5 then is backed onto lower deck L to the right end of the carrier. The sixth and last automobile to be loaded, Auto 6, is then driven and parked between Autos 4 and 5, the carrier length preferably being sufficient to insure that Autos 4 and 5 will be spaced apart adequately to permit loading of Auto 6 in this manner. When the carrier is thus fully loaded, the diagonal reinforcing rods R, see Figure 1, are replaced and, with the automobiles secured to the carrier in the usual manner to prevent shifting and rolling, is ready for transit.

The steps involved in unloading the carrier are the same as those described above taken in reverse order.

From the foregoing description of my invention, it will be seen I have provided a compact railway automobile carrier capable of safely carrying as many as six automobiles. The carrier has a self-contained loading mechanism which is simple in construction, easy to operate and is completely safe, and facilitates rapid loading and unloading of the carrier with a minimum number of operators.

Those skilled in the art will appreciate that various changes and modifications can be made in my invention without departing from the spirit and scope thereof and that the invention while particularly adapted to the loading and carrying of automobiles can be adapted to other purposes and uses.

I claim:

1. A railway automobile carrier for carrying a plurality of automobiles and the like comprising a body having open sides and an open top and supported on railway trucks, said body having a frame comprising upwardly extending longitudinally spaced rigid side struts and having lower and upper decks between said struts, said decks extending the full length of said body and being wider than the width of automobiles to be carried thereon, said lower deck having a continuous floor onto a portion of which automobiles can be driven, said upper deck being vertically aligned with said lower deck and being spaced from the floor of said lower deck by an amount greater than the overall height of the automobiles to be carried and comprising an elevating ramp for elevating automobiles from the lower deck to the upper deck and a stationary platform longitudinally aligned with said ramp, said ramp and said platform each having a pair of laterally spaced longitudinally extending track members adapted to receive the wheels of automobiles to be carried for supporting the automobiles, said platform being rigidly connected to certain of said side struts, said ramp being pivotally supported on others of said side struts at a point intermediate the ends of the ramp for pivotal movement about a transverse horizontal axis, the pivotal axis of said ramp being spaced a greater distance from the inner longitudinal end of said ramp proximate to said stationary platform than the vertical spacing between said upper and lower decks whereby said inner end of the ramp will contact the floor of the lower deck as a limit of downward pivotal movement of the ramp, and means for moving said ramp about its pivots between a position in the horizontal plane of said stationary platform and an inclined position with said one end of the ramp in contact with the floor of the lower deck.

2. A railway automobile carrier for carrying a plurality of automobiles and the like comprising a body having open sides and an open top and supported on railway trucks, said body comprising a frame and lower and upper decks supported on said frame, said decks extending the full length of said body frame, said lower deck having a continuous floor onto a portion of which automobiles can be driven, said upper deck being vertically aligned with said lower deck and being spaced from the floor of said lower deck by an amount greater than the overall height of the automobiles to be carried and comprising an elevating ramp for elevating automobiles from the lower deck to the upper deck and a stationary platform longitudinally aligned with said ramp, said ramp and said platform extending toward each other from one end and the other end, respectively, of said carrier and each having a pair of laterally spaced longitudinally extending track members adapted to receive the wheels of automobiles to be carried for supporting the automobiles, said platform being rigidly connected to said frame, said ramp being pivotally supported on said frame at a point intermediate the ends of the ramp for pivotal movement about a transverse horizontal axis, the pivotal axis of said ramp being spaced a greater distance from the inner longitudinal end of said ramp proximate to said stationary platform than from said one end of the carrier whereby said inner end of the ramp will contact the floor of the lower deck as a limit of downward pivotal movement of the ramp at a point longitudinally spaced a greater distance from said other end of the carrier than the inner end of the stationary platform is spaced from said other end of the carrier, and means for pivoting said ramp between a position in the horizontal plane of said stationary platform and an inclined position with said one end of the ramp in contact with the floor of the lower deck.

3. A loading mechanism for a railway automobile carrier having a rigid frame and vertically spaced upper and lower decks and an automobile elevating ramp mounted in the plane of the upper deck for pivoting about a horizontal axis, a flexible tension element secured at one end to said frame and at the opposite end to said ramp, drive means on said frame, and a rotatable lift element supported on said ramp, said drive means and said lift element lying in substantially the same vertical plane and being spaced apart, said tension element passing around said drive means and said lift element and engaging said drive means, and means for actuating said drive means for moving said tension element relative to said drive means whereby to move said lift element up and down and cause said ramp to pivot about said axis.

4. Loading mechanism for a railway automobile carrier having a frame and a lower deck and an upper deck, comprising, a ramp pivotally supported in the plane of the upper deck for pivotal movement about a transverse horizontal axis and having an outer end adjacent one end of the carrier and an inner end intermediate the ends of the carrier, the pivotal axis of said ramp being located closer to the outer end than to the inner end of the ramp, tension means positioned alongside said frame, said tension means being secured at one end to said frame and at the other end to said inner end of the ramp, a rotatable drive element and a rotatable lift element disposed in a common longitudinal plane and vertically spaced from each other, one of said elements being carried by and movable with said ramp adjacent the outer end thereof, the other element being supported on said frame adjacent the outer end of said ramp, said tension means passing around and engaging said drive and lift elements whereby, when said drive element is rotated and said tension means is moved relative thereto, the space between said elements is varied and said ramp is pivoted about said pivotal axis.

5. Loading mechanism for a railway automobile carrier having a frame and a lower deck and an upper deck, comprising, a ramp pivotally supported in the plane of the upper deck for pivotal movement about a transverse horizontal axis and having an outer end adjacent one end of the carrier and an inner end intermediate the ends of the carrier, the pivotal axis of said ramp being located closer to the outer end than to the inner end of the ramp, a pair of identical tension means disposed on opposite sides of said frame adjacent said ramp, each tension means being secured at one end to said frame and at the other end to said inner end of the ramp, a pair of rotatable drive elements carried by said frame on opposite sides thereof, a pair of rotatable lift elements carried by said ramp on opposite sides thereof, each of said lift elements being disposed in the plane of and spaced from a corresponding drive element on the same side of said frame and adjacent the outer end of said ramp, and a pair of sheaves each rotatably secured to said frame in the plane of the upper deck and adjacent said inner end of the ramp, each of said tension means passing under a lift element and over a sheave and engaging a drive element whereby, when said drive element is rotated and said tension means is moved relative thereto, the vertical spacing between said drive and lift elements is varied and said ramp is pivoted about said pivotal axis.

6. A railway automobile carrier having a frame and vertically spaced upper and lower decks, said frame having open sides and comprising a plurality of longitudinally spaced side struts connecting and bracing said upper and lower decks, the struts proximate to the center of the car being spaced apart sufficient to permit entry therebetween of an automobile into the carrier and upon the lower deck, said upper deck comprising a ramp having a length shorter than the length of the upper deck and being mounted in said frame for pivoting about a horizontal axis, means for pivoting said ramp between a substantially horizontal position and inclined position with one end thereof contacting said lower deck at a point intermediate the ends of the lower deck.

7. A railway automobile carrier comprising a frame and upper and lower decks supported on said frame, said upper deck comprising a pivotally supported ramp and a stationary platform, the adjacent inner ends of said ramp and platform being located substantially two-thirds of the distance between the ends of the frame, the pivotal axis of said ramp extending transversely of the frame and being located more remotely from the inner end than from the outer end of said ramp, said ramp, when lowered, having its inner end in contact with the lower deck at a point longitudinally spaced from the proximate end of the frame a distance greater than the length of the stationary platform whereby an automobile on the portion of the lower deck under said platform may be moved onto said lowered ramp for elevation to the plane of the upper deck.

8. The mechanism according to claim 3 in which the radial distance between the point of connection of said tension element to said ramp and said pivotal axis is twice the radial distance between said lift element and said pivotal axis.

References Cited in the file of this patent

UNITED STATES PATENTS

| | | |
|---|---|---|
| 2,146,203 | Demarest | Feb. 7, 1939 |
| 2,164,456 | Henry et al. | July 4, 1939 |
| 2,233,055 | Kennedy | Feb. 25, 1941 |
| 2,254,542 | O'Brien | Sept. 2, 1941 |
| 2,432,228 | DeLano | Dec. 9, 1947 |